United States Patent [19]

Sassenberg

[11] 4,285,592
[45] Aug. 25, 1981

[54] MULTIDIRECTIONAL PHOTOGRAPHIC COMPOUND STAGE

[76] Inventor: Richard Sassenberg, 422 Ward Ave., Mamaroneck, N.Y. 10543

[21] Appl. No.: 175,297

[22] Filed: Aug. 4, 1980

[51] Int. Cl.$^3$ ............................................ G03B 27/42
[52] U.S. Cl. ..................................................... 355/53
[58] Field of Search .......................................... 355/53

[56] References Cited

U.S. PATENT DOCUMENTS

| | | | |
|---|---|---|---|
| 2,459,552 | 1/1949 | Stoner et al. | 355/53 |
| 2,601,804 | 7/1952 | Nineberg | 355/53 |
| 2,605,675 | 8/1952 | Mourfield | 355/53 X |
| 3,495,519 | 2/1970 | Alfsen et al. | 355/53 X |
| 3,497,705 | 2/1970 | Adler | 355/53 X |
| 3,566,763 | 3/1971 | Knopf | 355/53 X |

*Primary Examiner*—Donald A. Griffin
*Attorney, Agent, or Firm*—Eugene E. Geoffrey, Jr.

[57] ABSTRACT

A multidirectional photographic compound stage having a base including a circular opening, a first carriage having rollers engaging the wall of the opening for rotary motion of the carriage, a second carriage having rollers for engaging parallel tracks on the first carriage for movement of the second carriage in one direction, a third carriage having rollers engaging parallel tracks on the second carriage for movement of the third carriage in a direction ninety degrees to the second carriage and a light transmitting operating surface carried by the third carriage.

10 Claims, 14 Drawing Figures

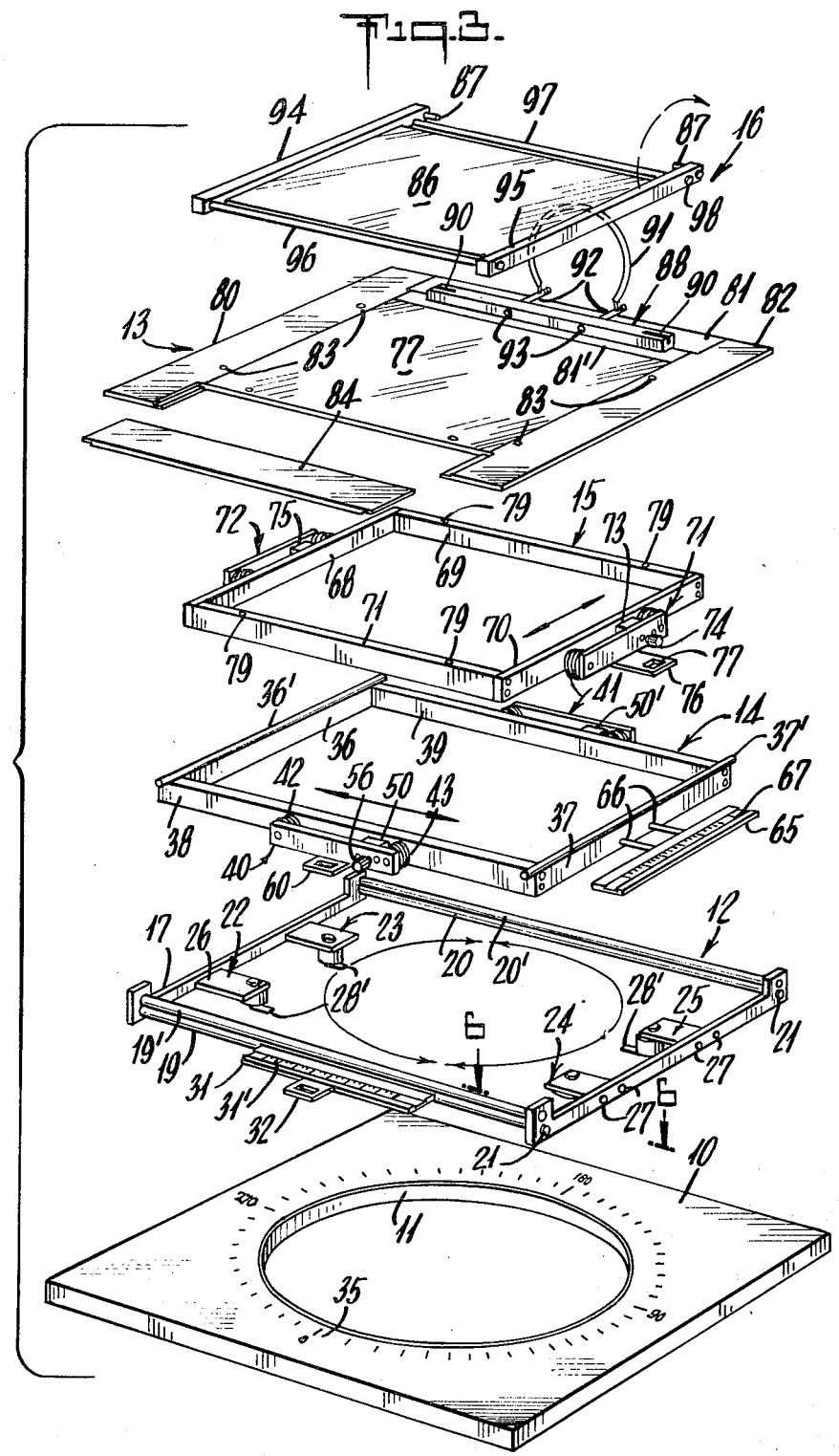

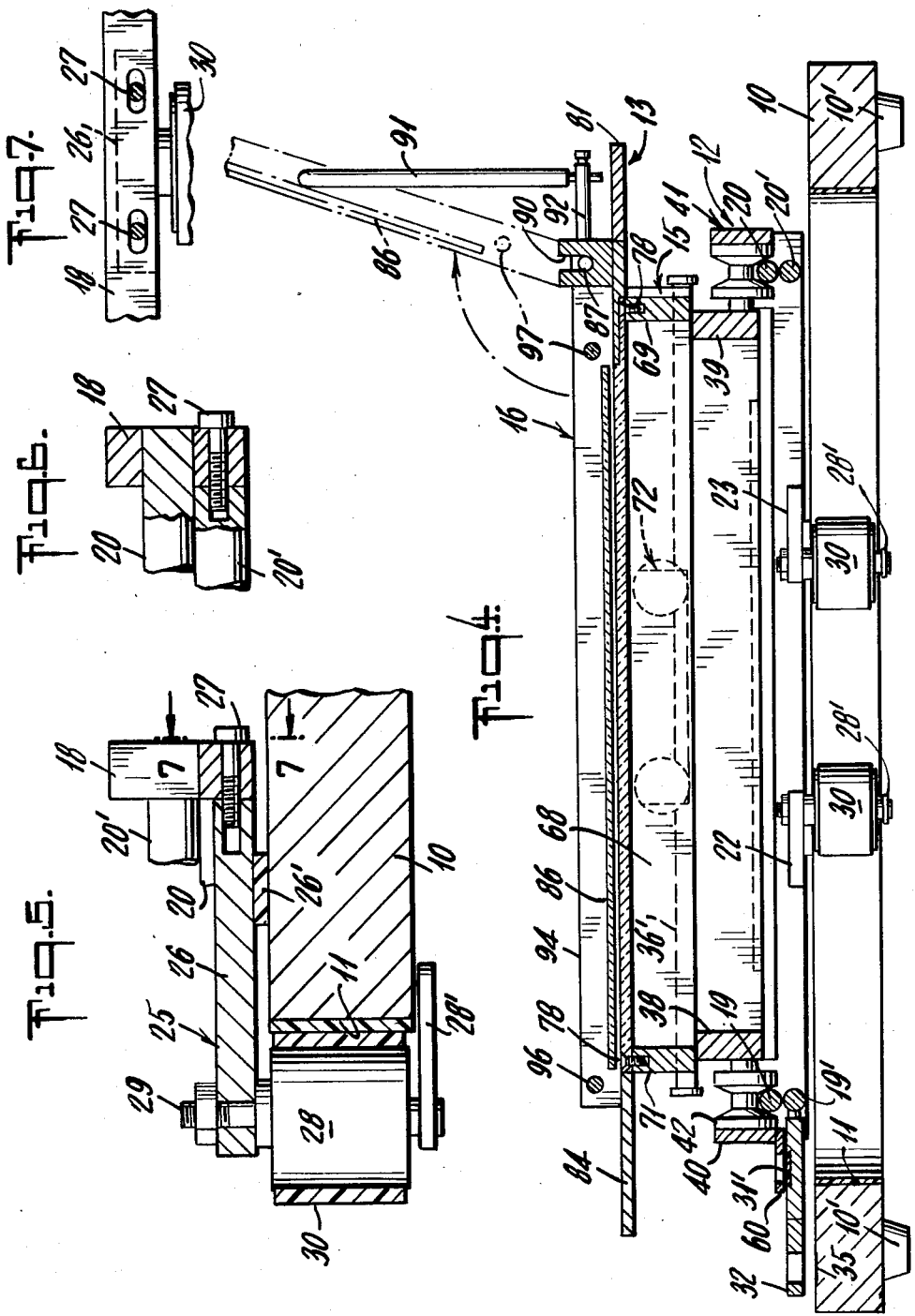

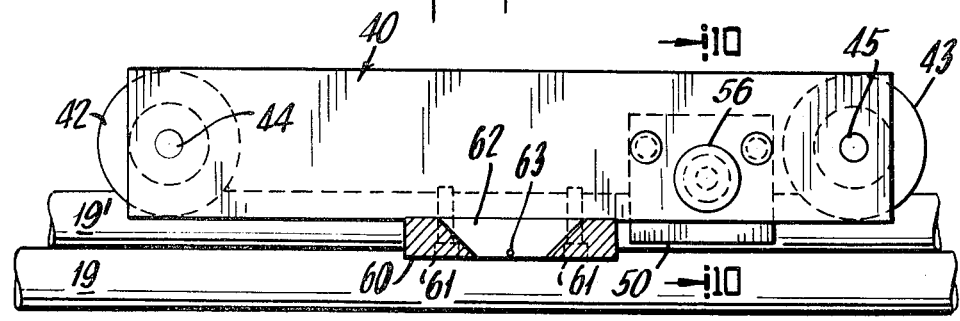
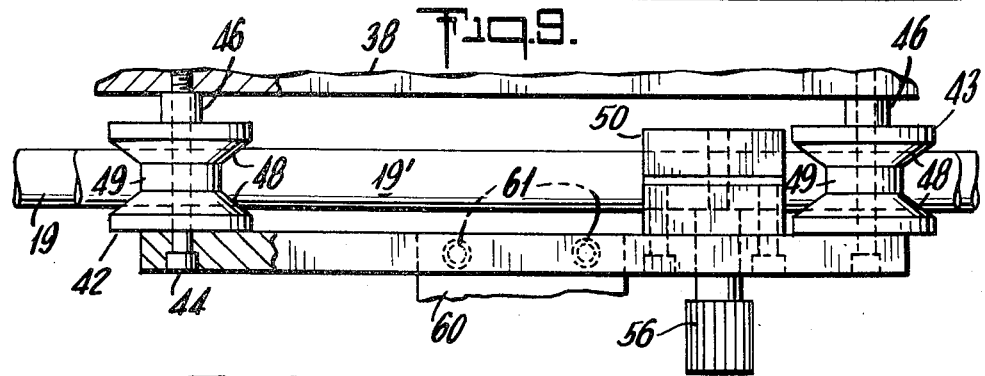
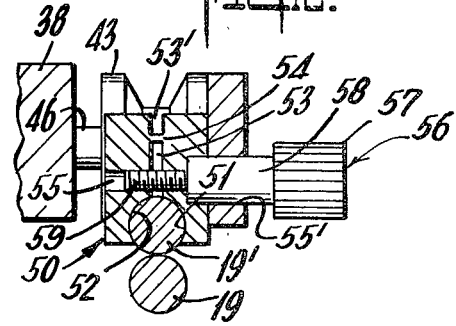
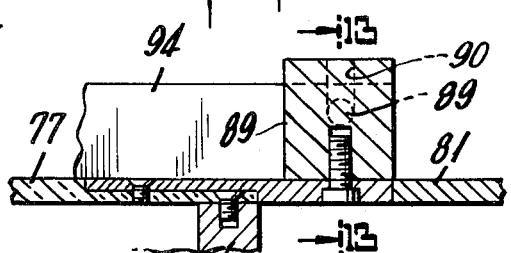
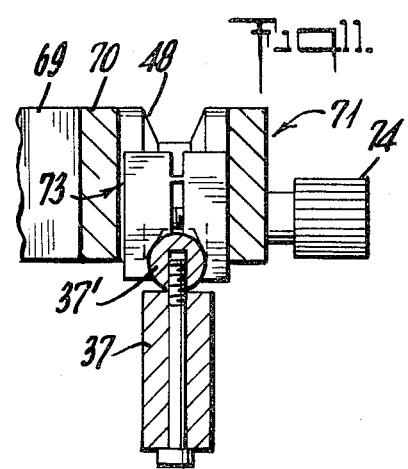
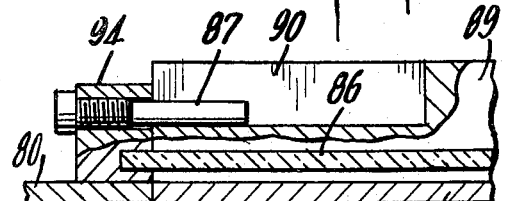
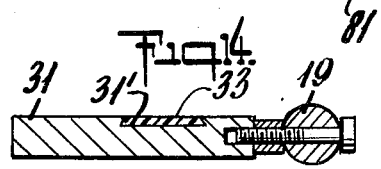

MULTIDIRECTIONAL PHOTOGRAPHIC COMPOUND STAGE

This invention relates to photographic apparatus and more specifically to a multidirectional photographic compound stage for photographing images which provides for precise rotational and bidirectional movement in the plane of an operating surface and is characterized by its reliability, simplicity and relatively low cost.

Photographic compound stages are generally used for, among other things, photographic copy work. Accordingly, the stage must be extremely stable and capable of effecting precise bidirectional and rotary movement. Known stages which achieve these ends embody relatively complicated mechanical structures of substantial strength to assure the required precision. As a result, such prior structures are not only extremely heavy and cumbersome but costly to manufacture and maintain.

This invention not only provides a novel and improved compound stage affording an extremely high degree of precision in movement of the operating surface, but also achieves that end with a structure that is light in weight, sturdy and inexpensive to manufacture and maintain.

Another object of the invention resides in the provision of a novel and improved compound stage embodying three interlocked carriages supported one upon the other to produce orthogonal and angular motion of the operating surface carried by the uppermost carriage.

Still another object of the invention resides in the provision of a compound stage embodying three carriages supported one upon the other and interlocked to prevent accidental disengagement thereof and characterized by its simplicity, high degree of precision and ease of operation.

A still further object of the invention resides in the provision of a novel and improved compound stage.

The compound stage in accordance with the invention includes a base having a central opening, a first carriage rotatably carried by said base and having guide rollers engaging the periphery of said opening, a second carriage having rollers engaging guide rails carried by the first carriage for linear movement of the first carriage in one direction, a third carriage having rollers engaging guide rails on the second carriage for linear movement in another direction and a light transmitting operating surface carried by the third carriage. The carriages while light in weight are interrelated mechanically to provide a high order of stability which enables the attainment of precise motion with minimum effort.

The above and other objects and advantages of the invention will become more apparent from the following description and accompanying drawings forming part of this application.

IN THE DRAWINGS

FIG. 3 is an exploded perspective view of the structure shown in FIGS. 1 and 2;

FIG. 4 is a cross-sectional view of FIG. 1 taken along the line 4—4 thereof;

FIG. 5 is a cross-sectional view of FIG. 1 taken along the line 5—5 thereof;

FIG. 6 is a cross-sectional view of FIG. 3 taken along the line 6—6 thereof;

FIG. 7 is a cross-sectional view of FIG. 5 taken along the line 7—7 thereof;

FIG. 8 is a cross-sectional view of FIG. 1 taken along the line 8—8 thereof;

FIG. 9 is a plan view of that portion of the structure illustrated in FIG. 8;

FIG. 10 is a cross-sectional view of FIG. 8 taken along the line 10—10 thereof;

FIG. 11 is a cross-sectional view of FIG. 1 taken along the line 11—11 thereof;

FIG. 12 is a cross-sectional view of FIG. 1 taken along the line 12—12 thereof;

FIG. 13 is a cross-sectional view of FIG. 12 taken along the line 13—13 thereof; and FIG. 14 is a cross-sectional view of FIG. 1 taken along the line 14—14 thereof.

The compound stage in accordance with the invention embodies a novel and improved arrangement of elements fabricated of relatively light weight materials yet providing an extremely high degree of rigidity and stability accompanied by ease of operation and precision of movement required for relatively complicated cinematographic procedures. As will become apparent, the compound stage is useful generally for any application requiring rotational and/or orthogonal motions.

Figure 1:
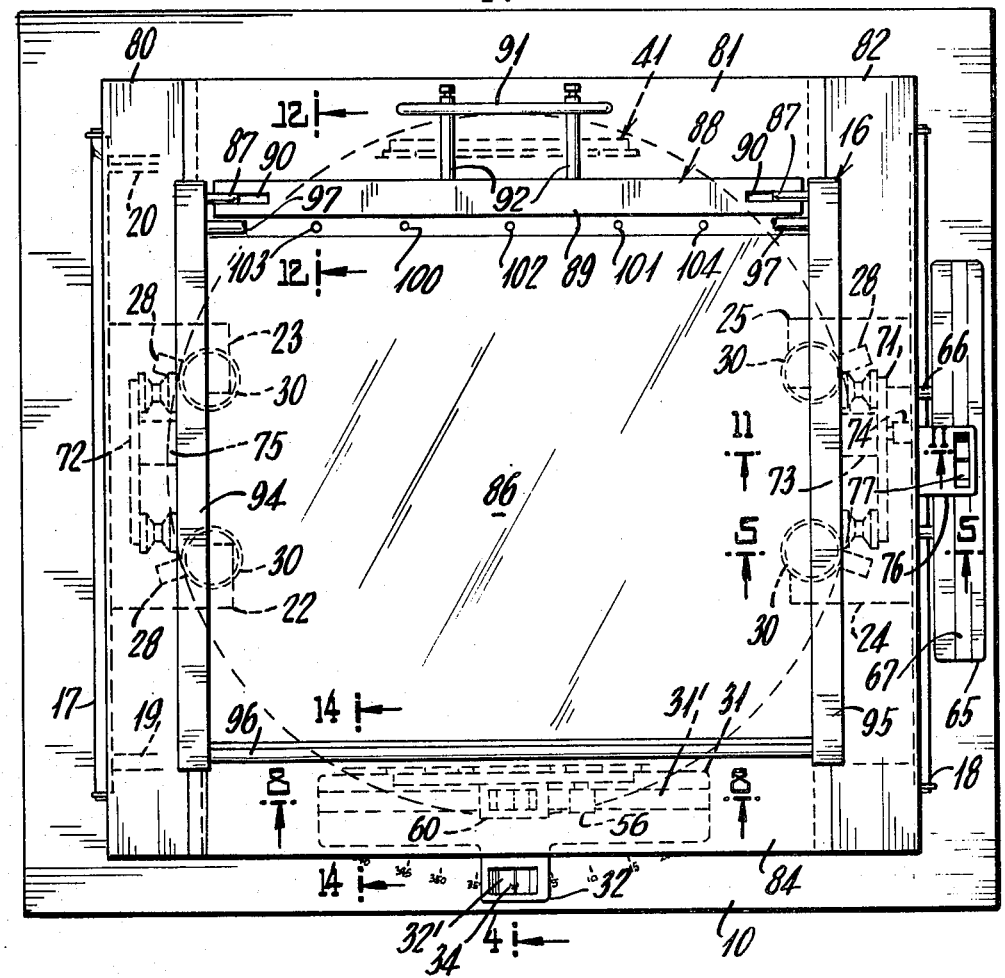
FIG. 1 is a plan view of a multidirectional photographic compound stage in accordance with the invention.
Figure 2:
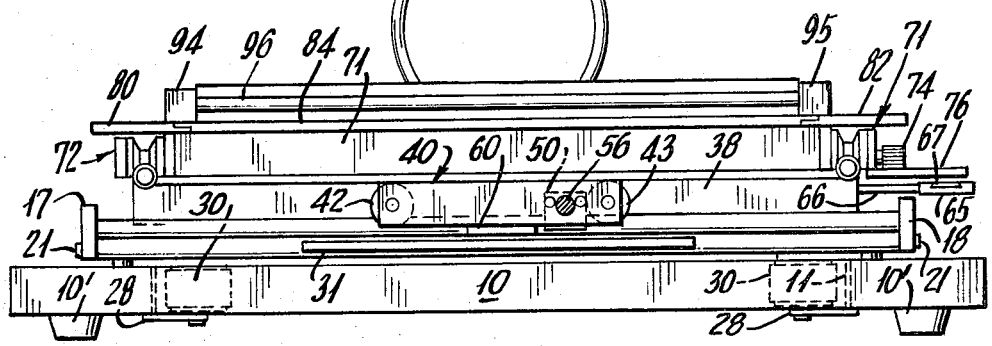
FIG. 2 is a front elevational view of the structure shown in FIG. 1.

Referring to FIGS. 1 through 4, it will be observed that the compound stage in accordance with the invention comprises a rectangular base 10 having a circular opening 11 therein. As will be shown, the opening 11 in the base 10 provides an annular track for guiding the first carriage generally denoted by the numeral 12 for rotational or circular motion. The opening also serves as means for backlighting material carried on the operating surface structure 13 as shown more clearly in FIG. 3. A second carriage 14 is movably carried by the carriage 12 for motion in a left to right or X direction as viewed in FIGS. 1 and 2. A third carriage 15 is movably supported on the carriage 14 for movement from front to rear or in the Y direction as viewed in FIGS. 1 and 2. The operating surface together with an overlying cover plate 16 forms part of the carriage 15. It is therefore evident that the structure affords rotary motion as well as bidirectional motion.

The first carriage 12 comprises a rectangular frame having relatively rigid side members 17 and 18 which are retained in spaced parallel relationship by a pair of relatively rigid rods 19 and 20. These rods are fixed to the end members 17 and 18 by screws 21 as will be observed more clearly in FIGS. 2, 3, and 6. Within the frame 12, there are four roller assemblies 22 through 25 with two of the assemblies carried by and extending inwardly of the frame member 17 and the other two, namely, 24 and 25, being carried by the opposing frame member 18. Each roller assembly comprises a bracket 26 fastened to its associated frame member by screws 27 extending through cooperating slots 27' to permit adjustment thereof. Each of the roller assemblies 22 through 25 as shown more clearly in FIG. 5 carries a roller 28 rotatably supported on a shaft 29 extending through and secured to the bracket 26. The rollers 28 each have a tubular covering 30 of a resilient material such as rubber, plastic or the like. These rollers engage the periphery of the opening 11 and ride about the periphery as the carriage 12 is rotated. Each of the brackets 26 further includes a strip of teflon 26' or other suitable material having a low coefficient of friction to provide smooth rotary motion of the carriage 12. Arms 28' are carried by the lower ends of the shafts or axles 29 of each roller assembly and extend beneath the base and in spaced relationship thereto to prevent disengagement of the carriage 12 from the base. Accordingly, the base 10 is provided with feet 10' to space it from a supporting surface.

The rod 19 carries an elongated plate 31 having a dove-tailed slot 31' slidably receiving a plate 33 having a linear scale on the upper surface thereof to facilitate adjustment of the scale. The plate 31 further carries an indicating structure 32 having an opening 32' extending therethrough and a thin wire serving as a marking element 34. This structure 32, which may be adjustable to set a desired zero position, cooperates with the angular scale 35 formed about the periphery of the opening 11 on the base 10 so that angular positions of the carriage 12 can be determined precisely. If desired, the roller assemblies 22 through 25 may be adjustably secured to the associated frame members 17 and 18 so that the pressure of the rollers 28 against the periphery of the opening 11 can be regulated. It is also to be noted that the roller assemblies 22 through 25 when engaging the periphery of the opening 11 cooperate with the frame elements of the carriage 12 to maintain its rectangularity at all times. In addition, the roller assemblies provide for precise rotational motion about a central axis and eliminates "play" which is frequently encountered with mechanical devices such as gears and the like.

The carriage 12 further includes a pair of tracks in the form of cylindrical rods 19' and 20' which overlie the rods 19 and 20. The rods 19' and 20' are merely supported by openings formed in the ends of the frame members 17 and 18 which provide a slight frictional engagement with the rods to prevent longitudinal displacement thereof. In so doing, the tracks 19' and 20' maintain precise linearity and will not deflect nor be deflected by the frame elements 17 and 18.

The carriage 14 which provides for motion in the X direction consists of four frame members 36 through 39 secured one through the others to form a rectangular configuration. The frame members 36 and 37 carry rods 36' and 37' fixed to the upper edge of the frame members 36 and 37. These rods provide the tracks for guiding the carriage 15, to be described, for providing motion in the Y direction. Frame members 38 and 39 each carry roller assemblies 40 and 41 which are substantially identical in configuration with the exception of retaining means for holding the carriage in engagement for the tracks 19' and 20'. As will be described, the retaining means carried by the roller assembly 40 is arranged to also clamp the track 19' to fix the carriage 14 in position while the retaining means carried by the roller assembly 41 merely slidably engages the track 20' to prevent the carriage 14 from being lifted out of engagement with the carriage 12.

The roller assembly 40 shown clearly in FIGS. 3, 8, and 9 includes a pair of spaced rollers 42 and 43, a front plate 44 and a pair of axles 44 and 45 extending through spaced openings in the plate 44, through the rollers 42 and 43 and threadably engaging cooperating openings in the frame member 38. Spacers 46 and 47 space the rollers 42 and 43 from the frame member 38. Each roller 42 and 43 is formed with a V groove having sloping edges 48 which ride on the surface of the track 19'. The base 49 of each roller is spaced slightly above the track 19' so that the rollers are guided solely by the sloping edge portions 48.

As previously mentioned, the rollers 42 and 43 of the carriage 14 are maintained in engagement with the track 19 by a hold-down and clamping structure generally denoted by the numeral 50 and is shown in cross section in FIG. 10. This structure is in the form of a block 51 having an opening 52 adjoining the bottom edge thereof to slidably engage the track 19'. It will be observed that the opening 52 intersects the bottom surface of the block 51 so that the track 19' is only partially positioned within the opening 52. The block 51 also is provided with a vertically disposed slot 53 extending upwardly from the opening 52 and a slot 53' formed in the upper surface of the block and aligned with slot 53 to form a narrow deflectable bridge 54. A transverse opening 55 extends through the block 51 and is aligned with a somewhat larger opening 55' in the plate 44. A thumb screw 56 has a knurled knob 57, a shank 58 extending through the opening 55' and partially into the block 51. A threaded portion 59 of the thumb screw 56 engages the threaded portion of opening 54 which lies to the left of the slot 53 as viewed in FIG. 10. With this arrangement when the thumb screw 56 is tightened, the block will firmly clamp the track 19 and hold the carriage in an adjusted position. When the thumb screw is loosened, the carriage will move freely but the rollers 42 and 43 cannot become disengaged from the track 19'. Indicating means 60 is secured to the underside of the plate 44 by a pair of screws 61 and extends outwardly therefrom as viewed more clearly from FIG. 3. The indicator has a central opening 62 and a thin indicating or marker wire 63 which cooperates with the scale 31' on the plate 31 carried by the carriage 12. Thus positioning to the left and right or X direction can be precisely determined and movements precisely repeated.

The roller assembly 41 carried by the frame member 39 is identical in structure to the roller assembly 40 previously described with the exception of the hold-down and clamping structure 50. Accordingly, a detailed description of the structure 41 is not deemed necessary. Since the hold-down structure 50' of the roller assembly 41 does not require the clamping action, the thumb screw 56, the transverse opening 55 and the slots 53 and 53' are omitted.

The carriage 14 is provided with a Y direction indicating scale 65 secured to the frame member 37 by tubular standoffs or sleeves 66. The plate 65 is formed in the same manner as the plate 31 as illustrated in FIG. 14 and slidably received a plate 67 carrying the indicating scale thereon. With this arrangement, the scale can be positioned longitudinally relative to the plate 65. Since the scale structure 65,67 cooperates with a marker carried by the carriage 15, as will be observed more clearly in FIG. 3, the scale can be adjusted to provide any desired zero position for carriage 15.

The carriage 15 is substantially identical to the carriage 14 in that it is provided with frame members 68 through 71 forming a rectangular structure as viewed more clearly in FIG. 3. Roller assemblies 72 and 72' are carried by the frame elements 70 and 68, respectively, with the roller assembly 72 being substantially identical to the roller assembly 40 on carriage 14, while the roller assembly 72' is substantially identical to the roller assembly 41 on the carriage 14. These roller assemblies engage the tracks 36' and 37' on the carriage 14 and thereby provide for movement of the carriage 15 in the Y direction. The roller assembly 72 carries hold-down and clamping means 73 operated by the thumb screw 74 as described in connection with the structure forming part of the roller assembly 40. The roller assembly 72' has hold-down structure 75 which is substantially identical to the hold-down structure 50' forming part of the roller assembly 41 as previously described. The roller assembly 72 further includes indicating means 76 having an opening 77 therein with a marking element extending transversely thereof for cooperation with the scale 67. In this way, the position of the carriage 15 relative to the carriage 14 can be accurately determined.

The operating surface structure 13 as viewed more clearly in FIG. 3 is secured to the carriage 15. The operating surface structure comprises a sheet of light transmitting material 77 preferably having translucent characteristics and is secured to the frame elements 69 and 71 of the carriage 15 by screws 78 which extend through openings in the light transparent sheet 77 and engage threaded openings 79 in the frame members 69 and 71 of the carriage 15. Opaque framing members 80, 81, and 82 surround three sides of the light transmitting member 77. The ends of the framing member 81 are interlocked with the edges of the framing members 80 and 82 and the members 80 and 82 are affixed to the frame elements 68 and 70 by means of screws extending through the openings 83 and threadably engaging frame elements 68 and 70 of the carriage 15. The framing member 81 is secured to the light transmitting member by screws 77'. The inner edges of the frame members 80, 81 and 82 are recessed and cooperate with corresponding recesses on the adjoining edges of the light transparent plate 77 so that the surface of the plate 77 is flush with the frame members 80, 81 and 82. The fourth frame member 84 has recessed edge portions which cooperate with the recessed edge portions of the frame members 80 and 82 so that it can be readily removed and replaced by the operator.

The cover member 16 includes a sheet of transparent material 86 such as glass or plastic and is hinged to the operating surface 13 by means of pins 87 extending inwardly from frame members 94 and 95 and a cooperating pin receiving element generally denoted by the numeral 88. More specifically, the element 88 comprises an elongated bar 89 secured to the upper surface of the frame element 81 and spaced from the edge 81' thereof. The ends of the bar 89 include grooves 90 which rotatably receive the pins 87 carried by the cover 16. An annular wire support 91 is spaced rearwardly of the bar 89 by spacers 92 and affixed to the bar 89 by means of screws 93. In this way, when the cover is moved to an open position the annular member 91 supports the cover in an inclined position sloping slightly to the rear.

The side frame members 94 and 95 are grooved along the lower edges thereof to receive the plate 86. A pair of rods 96 and 97 are affixed to the ends of the members 94 and 95 by means of screws 98 or other suitable fastening means to maintain the plate 86 in position thereon. With the foregoing arrangement the cover 16 can be removed readily from the operating surface 13 and replaced at the will of the operator.

From the foregoing description, it is evident that the compound stage in accordance with the invention provides a novel and improved arrangement of elements which affords smooth and precise motion of the operating surface 13 and insures accurate orthogonal and rotary motion. With the utilization of adjustable scales, precise zero positions of all three carriages can be set so that motions of the carriages can be accurately duplicated.

In many applications it is desirable to align successive pieces of material to be copied precisely on the operating surface 13, and for this purpose a plurality of alignment pin receiving openings are provided on the framing element 81 just forwardly of the cover hinging means 88. These openings are shown more clearly in FIG. 1 and are denoted by the numerals 100, 101, 102, 103, and 104. In certain applications the work is aligned utilizing the two spaced openings 100 and 101, and for this purpose appropriate pins are inserted therein which engage corresponding openings in the work piece. Another system for aligning work pieces utilizes a central opening 102 and openings 103 and 104 spaced on each side thereof. The openings 100 through 102 are usually ¼ inch in diameter while the openings 103 and 104 are usually approximately ⅛ inch in diameter. It is evident, however, that other pin arrangements may be utilized.

While only one embodiment of the invention has been illustrated and described, it is understood that alterations, changes and modifications may be made without departing from the true scope and spirit thereof.

What is claimed is:

1. A multidirectional compound stage for photographic reproduction of images comprising a relatively thick base having an opening therein defined by a circular wall, a first carriage having rollers extending from the bottom thereof and engaging the said circular wall to permit rotary motion of said carriage, a pair of spaced parallel tracks on said carriage, a second carriage overlying said first carriage and having at least two sets of rollers engaging said tracks for movement of said second carriage linearly in one direction relative to the first carriage, a pair of spaced parallel tracks carried by said second carriage and positioned at ninety degrees to the first said tracks, a third carriage overlying said second carriage and having at least two sets of rollers engaging the last said tracks for movement of said third carriage in a direction at ninety degrees relative to the motion of said second carriage and a light transmitting operating surface carried by said third carriage.

2. A multidirectional compound stage according to claim 1 wherein said tracks are in the form of cylindrical rods and the rollers in each of said sets of rollers have V-shaped grooves for engaging said cylindrical rods.

3. A multidirectional compound stage according to claim 2 wherein each of said second and third carriages includes means slidably engaging said tracks on the underlying carriage to maintain each of said sets of rollers in engagement with the associated tracks.

4. A multidirectional compound stage according to claim 3 wherein at least one of said slidable engaging means on each of said second and third carriages in the form of a clamp to releasably secure each of said first and second carriages to its underlying carriage in any selected position.

5. A multidirectional compound stage according to claim 4 wherein the first said carriage includes a pair of substantially rigid end frame elements of rectangular cross section secured one to the other by a pair of cylindrical frame rods to form a rectangular structure, said end frame elements each having openings above and aligned with the ends of said frame rods and a pair of cylindrical track rods frictionally engaging the last said openings, said cylindrical trade rods above being supported by and in alignment with said cylindrical frame rods.

6. A multidirectional compound stage according to claim 5 wherein each of the end frame elements of said first carriage includes a pair of inwardly extending brackets, said brackets each having a vertically disposed axle on the underside thereof for carrying one of the first said rollers, a pad having low coefficient of friction affixed to the underside of each bracket for spacing said brackets from said base and means carried at the bottom end of each axle and extending under and in spaced relationship to said base to maintain said rollers in engagement with said cylindrical wall.

7. A multidirectional compound stage according to claim 1 wherein said base includes an angular scale adjoining the periphery of the opening therein, said first carriage includes a linear scale and an angular position indicator cooperating with said angular scale, said second carriage includes a linear position indicator cooperating with said linear scale and a second linear positioning scale at ninety degrees to the first said linear scale, and said third carriage includes a linear position indicator cooperating with said second linear positioning scale.

8. A multidirectional compound stage according to claim 1 wherein said operating surface of said third carriage comprises a sheet of light transmitting material and said third carriage further includes disengageable hinge means along one edge thereof and a cover of light transparent material releasably engaging said hinge means to retain sheet material in position on the operating surface.

9. A multidirectional compound stage according to claim 8 wherein said operating surface includes material aligning means adjoining said operating surface.

10. A multidirectional compound stage according to claim 8 wherein said material aligning means includes a plurality of holes formed along at least one edge thereof and pins engaging selected holes, said pins engaging openings in said sheet material for precisely positioning said material on said operating surface.

* * * * *